United States Patent
Kim et al.

(10) Patent No.: US 8,126,473 B1
(45) Date of Patent: Feb. 28, 2012

(54) WIRELESS NETWORK USING HYBRID OF LICENSED AND UNLICENSED SPECTRUM

(75) Inventors: Byoung-Jo Kim, Morganville, NJ (US); Nemmara K. Shankaranarayanan, Bridgewater, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 734 days.

(21) Appl. No.: 11/289,995

(22) Filed: Nov. 30, 2005

(51) Int. Cl.
*H04W 72/00* (2009.01)
*H04W 36/00* (2009.01)

(52) U.S. Cl. .............. 455/452.1; 455/452.2; 455/436; 455/422.1

(58) Field of Classification Search ............ 455/436, 455/552.1, 454, 452.1, 421, 453, 403, 567, 455/406, 67.14; 370/329, 238, 352, 536, 370/338, 252, 328; 375/261
See application file for complete search history.

(56) References Cited

U.S. PATENT DOCUMENTS

| | | | | |
|---|---|---|---|---|
| 6,647,426 B2* | 11/2003 | Mohammed | ............ | 709/238 |
| 7,107,055 B2* | 9/2006 | Gallagher et al. | ............ | 455/436 |
| 7,269,151 B2* | 9/2007 | Diener et al. | ............ | 370/329 |
| 7,400,903 B2* | 7/2008 | Shoemake et al. | ......... | 455/552.1 |
| 7,512,094 B1* | 3/2009 | Linebarger et al. | ......... | 370/329 |
| 2005/0207395 A1* | 9/2005 | Mohammed | ............ | 370/352 |
| 2007/0026868 A1* | 2/2007 | Schulz et al. | ............ | 455/454 |

* cited by examiner

*Primary Examiner* — Kiet Doan (57) ABSTRACT

A system and method to dynamically allocate licensed transmission spectrum in conjunction with unlicensed transmission spectrum as a communication channel to meet quality of service requirements for cost efficient, high speed and high data capacity communications. The invention uses licensed spectrum to provide a guaranteed level of performance and can dynamically add unlicensed spectrum to enhance performance. Local high speed access can be achieved at low cost using unlicensed spectrum while maintaining a service level guarantees using licensed spectrum.

13 Claims, 5 Drawing Sheets

WIRELESS NETWORK USING HYBRID OF LICENSED AND UNLICENSED SPECTRUM

BACKGROUND

The invention relates generally to broadband wireless access communications networks. More specifically, embodiments of the invention relate to systems and methods which use a dynamic allocation of licensed transmission spectrum in conjunction with unlicensed transmission spectrum as a communication channel to meet QoS (quality of service) requirements for cost efficient, high speed and high data capacity communications.

Today, guided, or wired communications provide more capacity than unguided, or wireless radio frequency (RF) communications. As a local community networking solution for delivering high speed Internet access to schools, libraries, homes, businesses and Wi-Fi (wireless fidelity) hotspots, wireless has the distinct inherent advantage of not requiring wires and the costs associated with maintaining wires. Digital wireless has mainly been used for mobile users; however wireless is also practical for fixed position communications.

The traditional approach to using wireless spectrum is a complex procedure of assigning spectrum to various uses. This involves selling a license to a user for the exclusive use of a part of the spectrum. Once licensed, the user may use any frequencies that the license permits with restrictions on the type of transmission and levels of power.

Transceivers can communicate with other transceivers and pass digital communications to other wireless modems, to local area networks, or to the Internet. Wireless modems can achieve speeds that approximate the highest speeds available by wired alternatives. These speeds result from the combination of digital compression, error-correction, collision detection, mapping and retention of occupied frequencies, and dynamic frequency allocations.

Using these communications techniques can obviate the need to assign spectrum. A wireless modem can look for a clear channel and send a packet of data, and a return packet can be received. Some companies have been using a small and crowded portion of unlicensed spectrum, 902 to 928 MHz, for digital wireless communications.

Wireless communications can suffer from interference if the same radio spectrum is used within the geographic coverage area by another system. Most high-value, reliable wireless communications services such as cellular radio, broadband fixed wireless, television broadcasting, etc., are designed to use licensed spectrum. The use of licensed spectrum is strictly regulated and thus a license-owner has exact knowledge of any other users of the spectrum and can thus plan for it.

The very nature of licensed spectrum makes it a scarce and expensive resource. Most governments also set aside spectrum for unlicensed use to foster small users with simple devices.

Unlicensed radio spectrum is thought of as unreliable. Successful applications of unlicensed spectrum are Wi-Fi, LANs (local area networks), and cordless phones. The nature of unlicensed spectrum implies that it is impossible to predict who else might be using the same spectrum, and can therefore be an interferer.

There are technology and policy trends which are creating more opportunities for unlicensed spectrum use. There are vast areas of spectrum that are underutilized or not utilized. The tightly regulated TV broadcasting bands typically end up having large portions of unused spectrum, and there already is rulemaking in the United States to allow unlicensed operation in these bands.

As one example, television requires 6 MHz of bandwidth per channel. On the spectrum map, 376 MHz is the amount of bandwidth dedicated to television channels 14 to 69 (470 to 806 MHz). In large metropolitan areas there are conservatively 10 to 15 UHF channels using this spectrum with at least 40 empty channels. This amounts to 240 MHz of spectrum that could be used. There is additional spectrum between television broadcast channels—guard bands—that currently go unused.

There are proposed standards for wireless broadband access systems designed to deliver high speed and/or high data capacity from an Internet backbone over a four to six mile cell radius to an end user. These proposed systems include point-to-point and/or point-to-multipoint systems and operate in licensed and unlicensed spectrum over the frequencies between 2 and 11 GHz. As frequency drops, the ability for signals to pass through buildings increases for non-line-of-sight (NLOS) communications.

There are only a limited number of licensed bands in any geographic area. It is desirable for service providers to use unlicensed spectrum to provide capability to deliver high speed, high capacity data services. Additionally, a service provider may not hold licenses in every geographic area that it desires to provide service. Therefore, the use of unlicensed frequency bands may allow a service provider to cover a greater area.

The Federal Communications Commission (FCC) created a wireless arena known as the Unlicensed National Information Infrastructure (U-NII). System operators are free to operate wireless equipment in three unlicensed sub-bands: 5.15 to 5.25 GHz, 5.25 to 5.35 GHz and 5.725 to 5.825 GHz. Part 15 of the FCC document specifies the conditions for operating wireless equipment in the U-NII frequency band.

Interference is less of an issue concerning transmission within licensed bands. Most licensed bands are free of harmful interferers originating from outside sources. However, interferers can be present in unlicensed bands.

One problem with the use of unlicensed bands is that it is very difficult to control RF interference from other users. The other users may be using the selected unlicensed band for uses which are different from wireless communications. The 5.25 to 5.35 GHz and 5.725 to 5.825 GHz bands are available for broadband wireless access between two points. The same bands are also available for other wireless applications.

Interference is usually based on a signal-to-noise ratio (SNR) for any given channel. When interferers are present, some communications systems adapt by switching to a lower order modulation. For example, from 64QAM (quadrature amplitude modulation) to 16QAM, or 16QAM to QPSK (quadrature phase shift keying), or QPSK to BPSK (binary phase shift keying), or in the case of OFDM (orthogonal frequency division multiplexing) channel access, the modulation order of the subcarriers changes with SNR. Lower signal modulations are more tolerant to noise and interference, but reduce data rate.

Achieving data communications using unlicensed spectrum has proven problematic in wide-area commercial wireless services. With advances in technology that help radio devices to work around interferers, it is possible to use unlicensed spectrum that reach a high level of reliability. What is desired is a system and method for combining licensed and unlicensed spectrum as the channel for data communications.

SUMMARY

Although there are various systems and methods that perform data transmission using unlicensed spectrum as a communications channel, such methods and systems are not completely satisfactory. The inventors have discovered that it would be desirable to allocate licensed transmission spectrum in conjunction with unlicensed transmission spectrum as a communications channel to meet quality of service requirements for cost efficient, high speed and high data capacity communications.

The invention comprises systems and methods that use licensed spectrum to provide a guaranteed level of performance and can dynamically add unlicensed spectrum to enhance performance. Local high speed access can be achieved at low cost using unlicensed spectrum while maintaining a service level guarantee using the licensed spectrum.

One aspect of the invention provides methods for hybrid telecommunications. Methods according to this aspect of the invention preferably start with providing baseline communications up to a predetermined threshold of performance over at least a portion of licensed spectrum, and selectively supplementing the baseline communications with additional enhanced communications over at least a portion of unlicensed spectrum provided the predetermined threshold of performance is maintained.

Another aspect of the method is that the licensed and unlicensed spectrum use is apportioned simultaneously.

Yet another aspect of the method is adapting communications content into baseline information for communications over the portion of licensed spectrum and into enhanced information for communications over the portion of unlicensed spectrum.

Another aspect of the invention is a service method establishing a guaranteed level of performance for a communications stream, associating a baseline content with a licensed spectrum range, associating an enhanced content with an unlicensed spectrum range, and transmitting the baseline content and the enhanced content in a manner which maintains the guaranteed level of performance for the communications stream.

Other objects and advantages of theme systems and methods will become apparent to those skilled in the art after reading the detailed description of the preferred embodiments.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of the detailed description, would understand that in at least one embodiment, components in the method and system may be implemented in software or hardware.

Embodiments of the invention provide systems and methods for communications that can dynamically vary the amount of licensed and unlicensed transmission spectrum used as a communications channel meeting QoS requirements. The invention provides cost efficient, high speed and high data capacity communications exploiting the use of unlicensed spectrum. The invention is deployed as software and hardware. The application code for execution can reside on a plurality of different types of computer readable media known to those skilled in the art.

The invention can be a part of a single communications network, or a combination of communications networks including wireline, wireless, broadband, switched, packet or other type of network through which voice or data communications may be accomplished.

The invention uses licensed spectrum to provide a guaranteed level of performance, for example, a data rate of 0.5 Mbps, and can dynamically add unlicensed spectrum to enhance performance. The additive use of unlicensed spectrum can provide bit rates that are much higher than licensed spectrum alone can provide. SNR and QoS measurements examine what the telecommunications rates can be. The invention can be used for data-oriented communications where adaptation of content is feasible. Local high-speed access can be achieved at low cost using unlicensed spectrum while maintaining service level guarantees using licensed spectrum.

Figure 1:
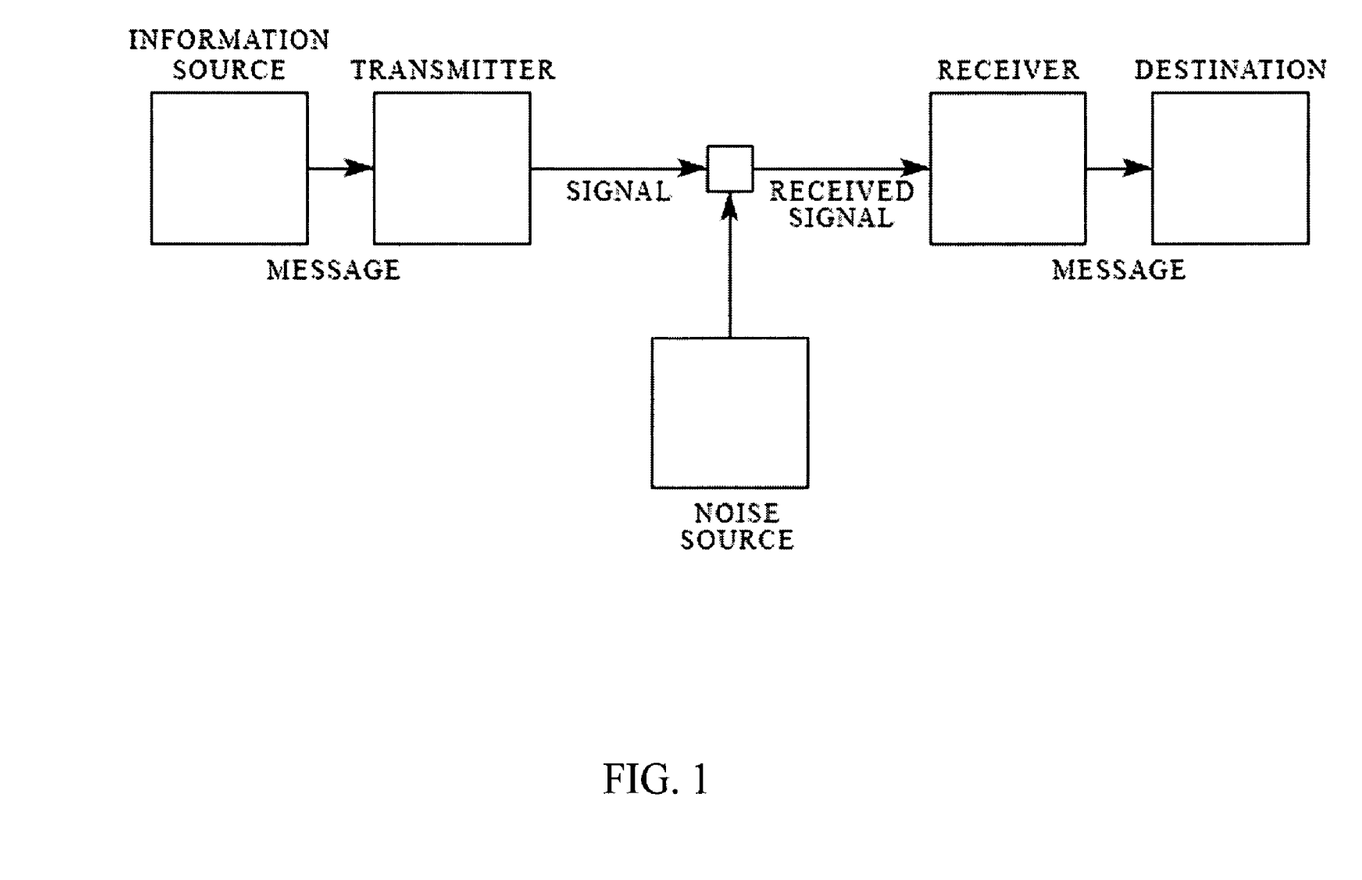
FIG. 1 is an exemplary Shannon-Weaver model of a communications system.

Shown in FIG. 1 is a classic Shannon-Weaver model of a communications system. It consists of essentially five parts: an information source, a transmitter, a channel, a receiver and a destination. The information source produces a message, or sequence of messages, to be communicated to the receiver. The message may comprise any form of data known to those skilled in the art such as a sequence of letters, one or more functions of time fit), video, and other combinations of data. The transmitter operates on the message to produce a signal suitable for transmission over the channel.

The channel is the medium used to transmit the signal from transmitter to receiver. For the purpose of this disclosure, it comprises the electromagnetic spectrum. The receiver performs the inverse operation of that performed by the transmitter, reconstructing the message from the signal. The destination is the object for which the message is intended.

The received signal is not necessarily the same as that sent out by the transmitter due to perturbations during transmission. The upper bound of a communication rate is determined in part by the thermal noise present in the communication channel. The amount of thermal noise present is measured by the ratio of the signal power to the noise power $$\frac{S}{N},$$

called the signal-to-noise ratio (SNR). Typically, the ratio is not quoted; it is represented by the quantity $$10 \log_{10} \frac{S}{N}.$$

The maximum data rate of a source coder's output that can be transmitted through a band limited additive white noise channel with no error is defined by Shannon's Noisy Channel Coding Theorem. Instead of constraining channel code efficiency, the revised Noisy Channel Coding Theorem states that some error-correcting code exists such that as the block length increases, error-free transmission is possible if the source coder's data rate is less than capacity. The maximum data rate of a noisy channel C whose bandwidth is w in Hz, and whose signal-to-nose ratio is $$\frac{S}{N},$$

given by $$C = w \log_2\left(1 + \frac{S}{N}\right) \frac{\text{bits}}{\text{s}}. \tag{1}$$

This result proscribes the maximum data rate of the source coder's output that can be transmitted through the band limited channel with no error. For this reason, capacity calculations are made to place limits on transmission rate.

Figure 2:
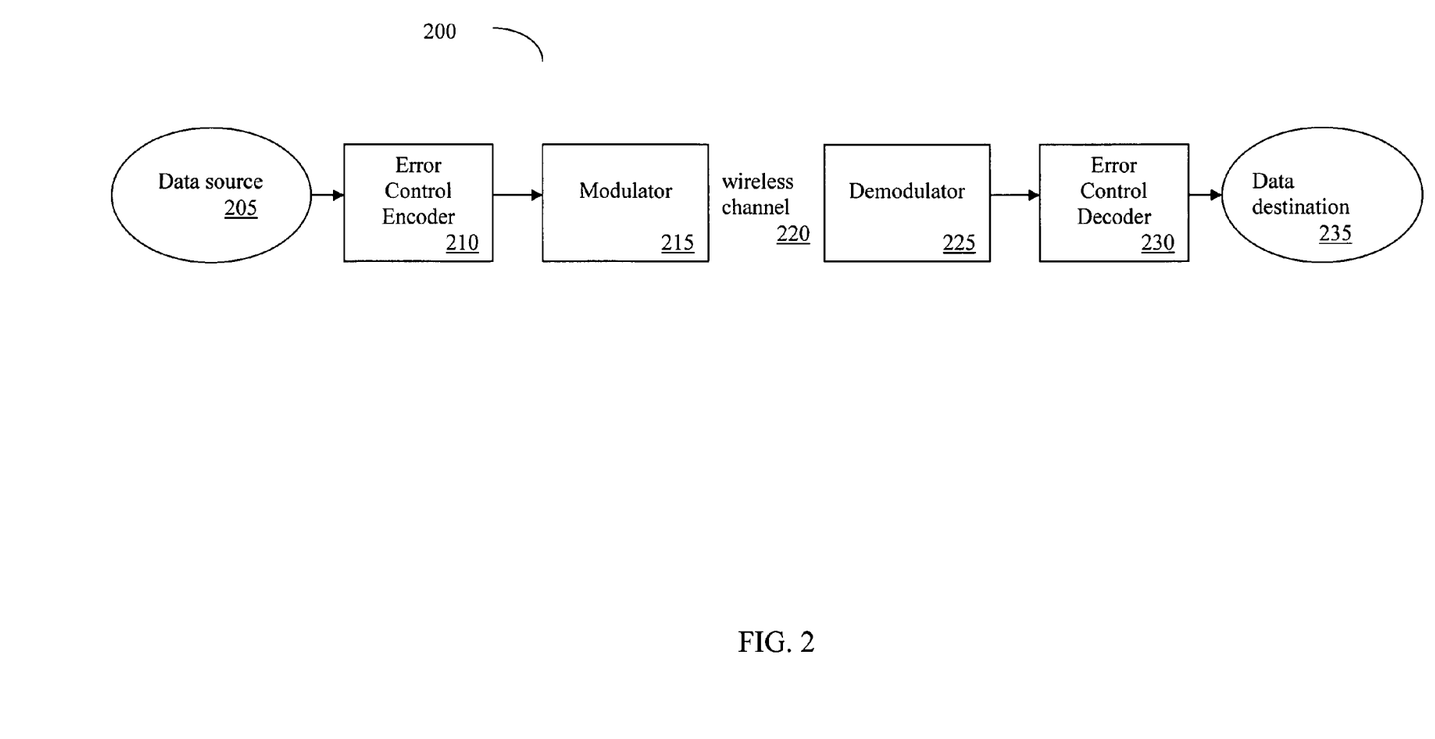
FIG. 2 is an exemplary physical layer of the individual modules for the system shown in FIG. 1.

Shown in FIG. 2 is a physical layer corresponding to the communications system shown in FIG. 1. The communications system 200 includes a data source 205, an error control encoder 210, a modulator 215, a communication channel 220, a demodulator 225, an error control decoder 230 and a data destination 235. Modulation techniques such as OFDM channel access with subcarrier modulations of QPSK and QAM may be used as well as others. The wireless channel 220 is characterized by path loss, multipath delay spread, fading characteristics, Doppler spread, co-channel and adjacent channel interference, and antenna gain reduction factor, and the error control coding compensates for bit errors that are experienced in times of deep fade in the channel. A Reed Solomon encoder and decoder, convolutional encoder and Viterbi decoder, and the randomizer/de-randomizer and interleaver/deinterleaver are implemented. One skilled in the art appreciates the functionality of each component. A detailed discussion of the functionality of each component is beyond the scope of this disclosure.

In the fields of packet-switched networks and computer networking, the traffic engineering term QoS refers to the probability of the telecommunications network meeting a given traffic contract, or in many cases, is used informally to refer the probability of a packet succeeding in passing between two points in the network—a guaranteed throughput. QoS describes network device capabilities that provide some guarantee of performance such as throughput, priority, speed, latency, etc., and refers to a broad collection of networking technologies and techniques. This allows providers to guarantee to their customers that end-to-end latency will not exceed a specified level. In networking, latency is the amount of time it takes a packet to travel from source to destination. Together, latency and bandwidth define the speed and capacity of a network—the amount of data transferred from one place to another or processed in a specified amount of time.

The goal of QoS is to provide guarantees on the ability of a network to deliver predictable results. Elements of network performance within the scope of QoS include availability (uptime), bandwidth (throughput), latency (delay), and error rate. For each quality of service parameter, the worst case performance for each parameter is specified, and the carrier is required to meet or exceed it. In some cases, the parameter is a minimum, in others, it is a maximum.

Most Internet services are mapped to a connection. This provides a mechanism for requesting bandwidth, associating QoS and traffic parameters, transporting and routing data to the appropriate convergence sublayer, and all other actions associated with the contractual terms of the service.

IP-based (Internet Protocol) networks offer QoS guarantees by deploying technologies such as Differentiated Services (DiffServ) and Multi-Protocol Label Switching (MPLS) for traffic engineering and network-wide resource management. The management and control of such networks include the following aspects emerging Service Level Agreements (SLAB) and Service Level Specifications (SLSs) for the subscription to QoS-based services; management protocols for off-line service negotiation and signaling mechanisms for the dynamic invocation of service instances; approaches for the derivation of a traffic matrix based on subscribed SLAs/SLSs and monitoring data; algorithms for off-line traffic engineering and provisioning through MPLS or through plain IP routing with QoS extensions; algorithms for dynamic resource management to deal with traffic fluctuations outside the predicted envelope; and a policy-based overall framework for traffic engineering and service management. Current standards interested in improving service increase QoS by tagging different types of traffic, such as voice, video and data, with various priority levels.

In contrast to the cellular mobile networks, Wi-Fi uses unlicensed spectrum. Accordingly, potential entrants cannot be excluded regardless of increased congestion. The degradation in QoS caused by interference is already occurring in crowded areas, such as airports and apartment buildings. A solution allows for the automatic choice of channels to reduce interference.

The invention supports QoS functionality by dynamically assigning additional unlicensed bandwidth that increases throughput when necessary, employing a pseudo-bandwidth-on-demand. Bandwidth-on-demand is advantageous because it makes more efficient use of the finite channel spectrum and correspondingly increases capacity and useable bandwidth. The invention is capable of differentiating between the need for low-latency operation where errors can be tolerated, i.e., streaming video, versus the need for error-free transmission where higher latency can be tolerated. To achieve efficiency, the invention assigns bandwidth based on the actual demands. The bandwidth can be allocated to users when setting up a transmission. The invention can renegotiate the requested bandwidth whenever it has to transfer traffic bursts with certain peak rates.

By way of background, bandwidth-on-demand is a data communication technique for providing additional capacity on a communications link as necessary to accommodate bursts in data traffic, i.e., a videoconference. The technique is commonly used on dial-up lines and WANs (wide area networks) to temporarily boost the capacity of a link. Telephone companies and other providers offer bandwidth on demand as part of their service offerings. Both ISDN and frame relay provide the services and have the potential to replace expensive dedicated leased lines such as T1 lines. Basic rate ISDN has two 64-kbits/sec B channels that can be combined into a single 128-kbits/sec channel using bandwidth-on-demand techniques.

Figure 3:
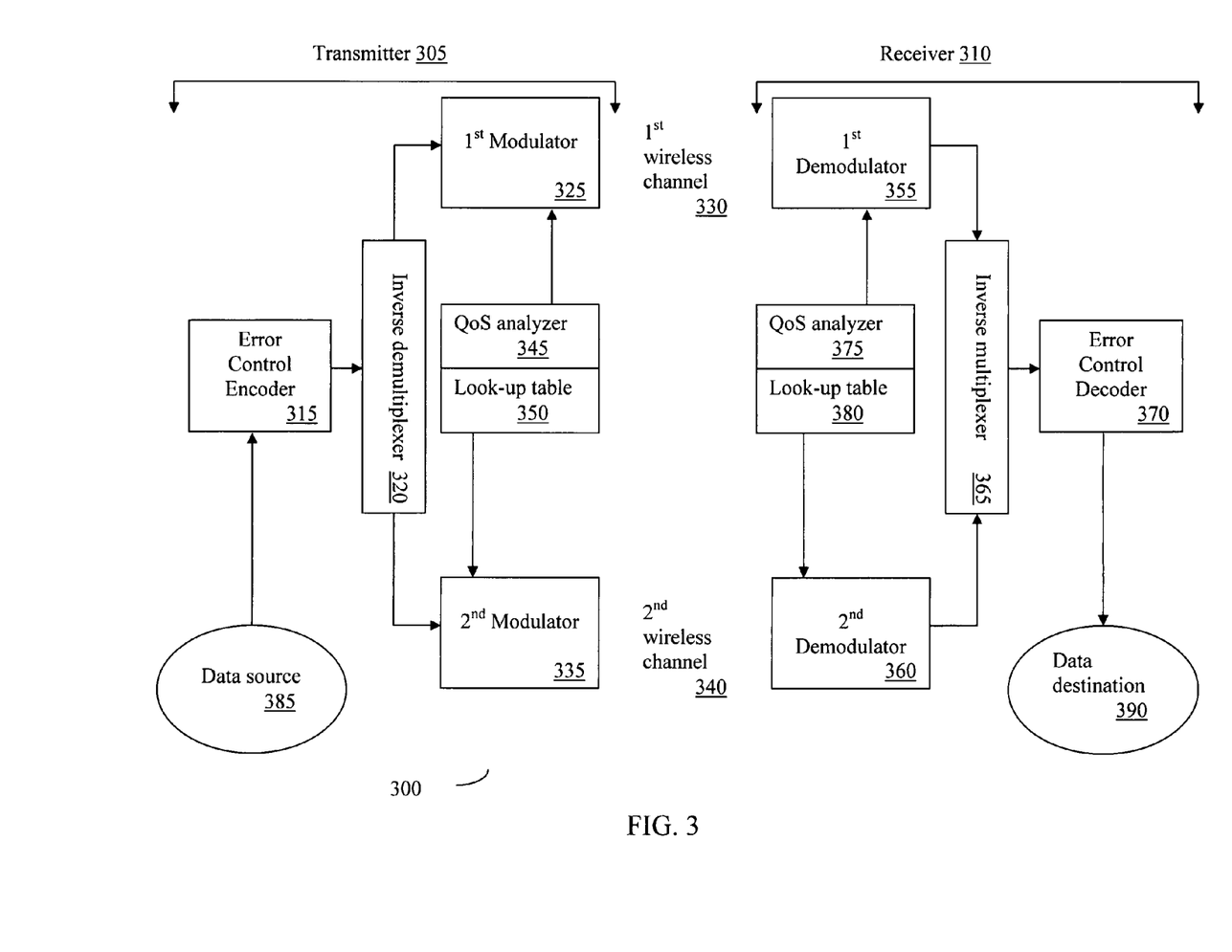
FIG. 3 is an exemplary physical layer of the individual modules of one embodiment of the invention.
Figure 4:
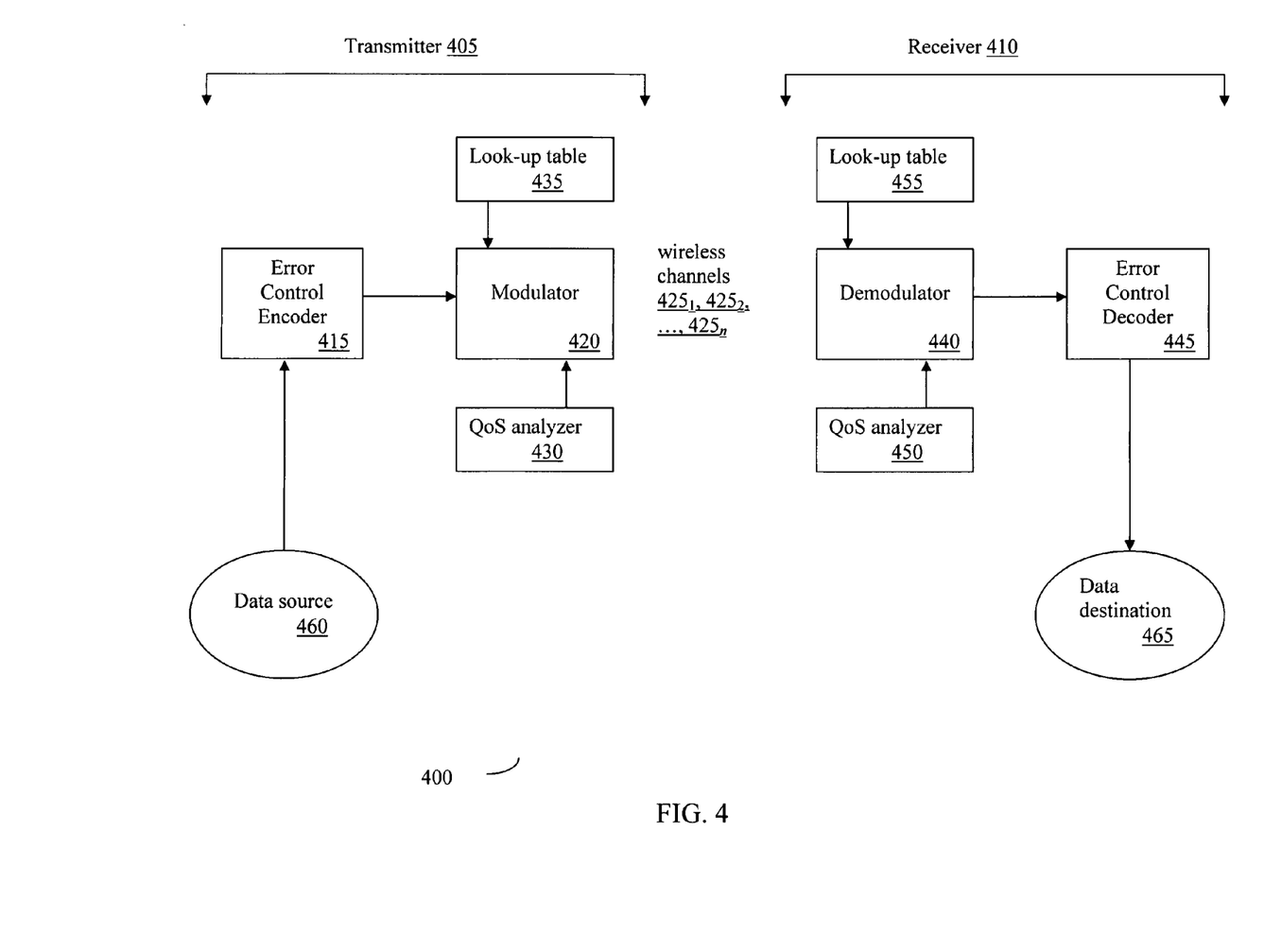
FIG. 4 is an exemplary physical layer of the individual modules of another embodiment of the invention.
Figure 5:
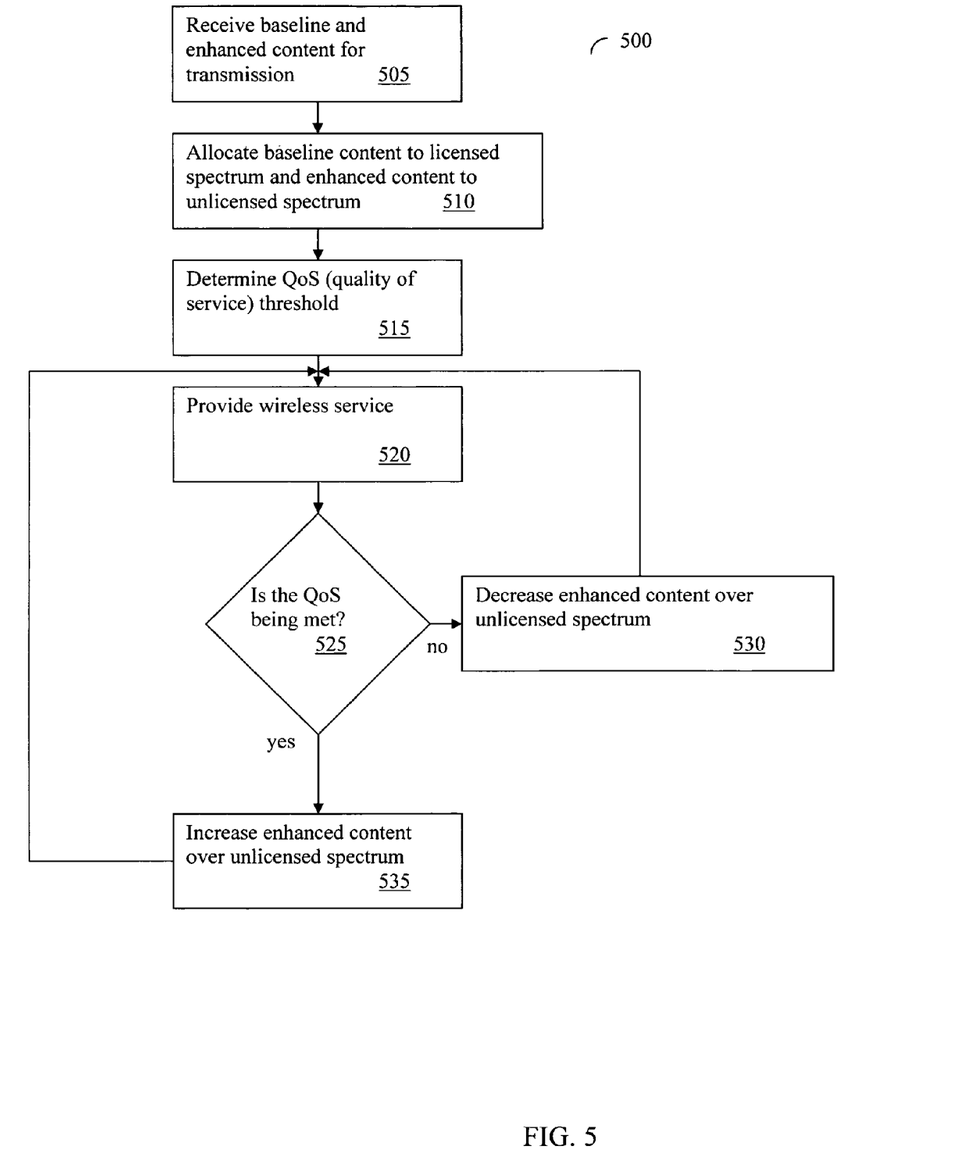
FIG. 5 is a block diagram of an exemplary method according to the invention.

Shown in FIGS. 3 and 4 are physical layers of the various coupled modules that comprise two embodiments of the invention. Shown in FIG. 5 is a corresponding flowchart of the method according to the teachings of the invention. The embodiment 300 shown in FIG. 3 comprises a transmitter 305 and a receiver 310 for one-way communications. As one skilled in the art can appreciate, the invention can be embodied as a transceiver for two-way communications.

The transmitter 305 modules include an error control encoder 315, an inverse demultiplexer 320, a first frequency agile modulator 325, a corresponding first wireless channel 330, a second frequency agile modulator 335, a corresponding second wireless channel 340, a QoS analyzer 345 and a look-up table (LUT) 350.

The receiver 310 modules include a first frequency agile demodulator 355 for receiving the first wireless channel 330, a second frequency agile demodulator 360 for receiving the second wireless channel 340, an inverse multiplexer 365, an error control decoder 370, a QoS analyzer 375 and an LUT 380. The system transmits data from a source 385 to a destination 390.

Data is input at the source 385 and processed by the encoder 315. Depending upon the data rate requirement, inverse demultiplexing 320 is performed on the encoded data stream. The data stream is apportioned into data streams based upon predetermined bandwidths and data rates that can be supported (equation (1)).

The first frequency agile modulator 325 transmits data within licensed spectrum 330. The second frequency agile modulator 335 transmits data within unlicensed spectrum 340. The transmitter QoS analyzer 345 and LUT 350 know, a priori, what the incoming data rate is and what bandwidth is required to support that data rate. The transmitter 305 and receiver 310 communicate via overhead messaging to establish what frequencies the first frequency agile modulator 325/demodulator 355 and second frequency agile modulator 335/demodulator 360 will be assigned.

The modulators 325, 335/demodulators 355, 360 can employ any modulation schemes known in the art. Modulation is the process of varying a carrier signal in phase, frequency or amplitude to convey information. In digital modulation, the changes in the signal are chosen from a fixed modulation alphabet where each entry conveys a different possible piece of information known as a symbol. A detailed discussion of the variety of modulation techniques is beyond the scope of this disclosure.

The invention uses licensed spectrum to provide a guaranteed level of performance and dynamically adds unlicensed spectrum to enhance performance. For example, a small amount of licensed spectrum can provide a guaranteed QoS at a data rate of 0.5 Mbps. The first frequency agile modulator 325 (and demodulator 355) is assigned a carrier frequency from the LUT 350 (and LUT 380) within a predetermined licensed bandwidth necessary to support the 0.5 Mbps, or baseline data rate. Data rates above 0.5 Mbps are transmitted using the second frequency agile modulator 335 (and demodulator 360), and are assigned a carrier frequency from the LUT 350 (and LUT 380) within a predetermined unlicensed bandwidth necessary to support the excess, or enhanced data rate. The large amount of unlicensed spectrum is used to enhance performance and provide a total, combined data rate that is much higher than rates possible with only licensed spectrum.

At the receiver, inverse multiplexing 365 combines the individual data streams into a single, higher-speed channel. Data is divided at the transmitter 305 end and recombined at the receiver 310 end. Both the transmitter and receiver must use the same inverse demultiplexing 320 and inverse multiplexing 365 techniques.

FIG. 3 shows first and second modulator/demodulator pairs. One skilled in the art can appreciate that more than two modulator/demodulator pairs can be used to allocate more than two channels by bonding multiple channels to create a large aggregate channel. The invention can increase or decrease bandwidth in the modulator/demodulator pairs.

The embodiment 400 shown in FIG. 4 comprises a transmitter 405 and a receiver 410 for one-way communications. As above, the invention can be embodied as a transceiver.

The transmitter 405 modules include an error control encoder 415, a frequency agile modulator 420, corresponding wireless channels $425_1$, $425_2$, ..., $425_n$, a QoS analyzer 430 and an LUT 435.

The receiver 410 modules include a frequency agile demodulator 440 for receiving the wireless channels $425_1$, $425_2$, ..., $425_n$, an error control decoder 445, a QoS analyzer 450 and an LUT 455. The system transmits data from a source 460 to a destination 465.

The data stream is apportioned into data streams for communication over wireless channels $425_1$, $425_2$, ..., $425_n$ based upon predetermined bandwidths and data rates that can be supported (equation (1)).

The first frequency agile modulator 420 transmits data within licensed and unlicensed spectrum (wireless channels $425_1$, $425_2$, ..., $425_n$) using one modulator and dynamic frequency allocation. The transmitter QoS analyzer 430 and LUT 435 know, a priori, what the incoming data rate is and what bandwidth is required to support that data rate. The transmitter 405 and receiver 410 communicate via overhead messaging to establish what frequencies the frequency agile modulator 420/demodulator 440 will be assigned.

A small amount of licensed spectrum providing a guaranteed QoS is assigned a carrier frequency from the LUT 435 (and LUT 455) within a predetermined licensed bandwidth necessary to support the baseline data rate. Data rates above the guaranteed rate are assigned a carrier frequency from the LUT 435 (and LUT 455) within a predetermined unlicensed bandwidth necessary to support the enhanced data rate. The frequency agile modulator 420/demodulator 440 performs an inverse demultiplexing/inverse multiplexing function using dynamic frequency allocation. Dynamic frequency allocation allows the incoming data stream 460 to be divided among a plurality of channels $425_1$, $425_2$, ..., $425_n$, with at least two channels residing in licensed and unlicensed spectrum. At the receiver 410, demodulator 440 combines the plurality of channels $425_1$, $425_2$, ..., $425_n$ into a single, higher-speed channel.

Shown in FIG. 5 is a corresponding system flow 500. The invention efficiently processes the allocation and de-allocation of licensed and unlicensed bandwidth based on various sized data rates. The invention determines when to increase or decrease bandwidth in a channel, or to add or subtract channels as follows.

A data stream having a known data rate from a data source 385 is input to the transmitter 305 (step 505). The data can comprise voice, data or video, or a combination of all three. After the data is encoded 315, a baseline data rate determination is performed for priority communications, for example, voice and data may be determined to be the more important, with video having secondary importance (step 510). A higher layer policy can also be used to determine data rate. For baseline data, the transmitter allocates licensed spectrum. For enhanced or secondary data, the transmitter allocates unlicensed spectrum. The transmitter LUT 350 contains a mapping of available licensed frequencies and available unlicensed frequencies that the first 325 and second 335 frequency agile modulators can tune to. In dependence on the data rate determined by QoS level (step 515), bandwidth is allocated for each modulator. The data stream is inverse demultiplexed 320, modulated 325, 335 and transmitted over both channels 330, 340 (step 520).

Using channel overhead, the receiver 310 receives the preselected transmitting frequencies of the first 325 and second 335 modulators and tunes the first 355 and second 360 demodulators to the pre-selected frequencies and receives the data transmission. The data stream is received by both demodulators and is inverse multiplexed back into one data stream. The data stream is decoded 370 and output 390.

During data transmission, QoS levels are monitored (step 525). If the quality of service is not being met, the invention decreases the enhanced content bandwidth (step 530). If the quality of service is being met, the invention increases the enhanced content bandwidth (step 535).

For example, there can be a richly featured communication using video conferencing which will satisfy QoS most of the time. If a problem is experienced with the unlicensed channel, the invention can step down to a mode which only transmits the baseline content, i.e., audio and text messaging. There are other possibilities of adaptation or coding of content with varying degrees of quality, e.g., different sizes or resolutions of an image.

Broadband wireless access (BWA) networks are important for promising applications like high-speed wireless Internet access and multimedia services such as video conferencing. BWA is expected to address the "last mile" issue that is currently dominated by DSL and cable technologies. Fixed wireless networks may prove to be extremely useful in regions where deployment of wired systems is not feasible.

Although the invention herein has been described with reference to particular embodiments, it is to be understood that these embodiments are merely illustrative of the principles and applications of the present invention. Moreover, although hardware or software have been used to implement certain functions described in the present invention, it will be understood by those skilled in the art that such functions may be performed using hardware, software or a combination of hardware and software. It is therefore to be understood that numerous modifications may be made to the illustrative embodiments and that other arrangements may be devised without departing from the spirit and scope of the present invention as defined by the appended claims.

What is claimed is:

1. A method for providing hybrid telecommunications comprising:
    determining, from communications content to be transmitted, baseline content associated with a defined level of performance for data transmission and enhanced content, wherein the baseline content provides a pre-defined level of information to facilitate an understanding of the communication content and the enhanced content provides a supplemental level of information beyond the pre-defined level of information that supplements the understanding of the communication content;
    transmitting the baseline content over at least a portion of a licensed spectrum that provides the defined level of performance; and
    selectively supplementing, based on availability of at least a portion of an unlicensed spectrum, the baseline content with additional enhanced content over at least the portion of an unlicensed spectrum while maintaining transmission of the baseline content on the licensed spectrum, wherein apportioning of the licensed and unlicensed spectrum is perform simultaneously and at least portion of the unlicensed is added dynamically.

2. The method according to claim 1 further comprising adapting the communications content into the baseline communications content for communications over at least the portion of the licensed spectrum and into the enhanced communications content for communications over at least the portion of the unlicensed spectrum.

3. The method according to claim 1 wherein transmitting the baseline communications content comprises transmitting at a low data rate.

4. The method according to claim 1 wherein transmitting the enhanced communications content comprises transmitting at a high data rate.

5. A telecommunications service method comprising:
    separating a communications data stream into a first portion comprising a baseline content and a second portion comprising an enhanced content, the baseline content providing a basic understanding of the communications content and the enhanced content supplementing the basic understanding;
    establishing a pre-defined level of performance for the baseline content;
    associating the baseline content with a licensed spectrum range;
    associating the enhanced content with an unlicensed spectrum range; and
    transmitting the baseline content over the licensed spectrum range and selectively transmitting the enhanced content over the unlicensed spectrum range in a manner which maintains the pre-defined level of performance for the baseline content,
    wherein apportioning of the licensed and unlicensed spectrum is performed concurrently and the unlicensed spectrum rang is added dynamically.

6. A non-transitory computer readable storage medium comprising computer executable instructions that, in response to execution by a computing system, cause the computing system to perform operations, comprising:
    separating communications content into a first portion comprising baseline information and a second portion comprising enhanced information, wherein the baseline information is associated with a defined Quality of Service and provides a basic understanding of the communications content, and the enhanced information supplements the basic understanding;
    transmitting the baseline information over at least a portion of a licensed spectrum, wherein the licensed spectrum can support the baseline information defined Quality of Service; and
    selectively supplementing transmission of the baseline information with the enhanced information over at least a portion of an unlicensed spectrum while the baseline information defined Quality of Service on the licensed spectrum is maintained, wherein the apportioning of the licensed and unlicensed spectrum is perform simultaneously and at least portion of the unlicensed is added dynamically.

7. The system according to claim 6 further comprising adapting the communications content into the baseline information for communications over the at least the portion of the licensed spectrum and into enhanced information for communications over the at least the portion of the unlicensed spectrum.

8. The system according to claim 6, wherein the baseline information comprises a minimum amount of data facilitating comprehension of the communications content.

9. A hybrid telecommunications system comprising:
a lookup table mapping available licensed spectrum and available unlicensed spectrum;
a data stream comprising at least one of voice data, information data, video data, or combination thereof; wherein a first portion of the at least one of voice data, information data, video data, or combination thereof is designated as baseline communications content, wherein the baseline communications content has a defined Quality of Service the baseline communications content provides a basic understanding of information conveyed in the data stream; and second portion of the at least one of voice data, information data, video data, or combination thereof is designated as enhanced communications content and the enhanced content supplements the basic understanding of information conveyed in the data stream; and
a transmitter for configured to provide communications in accordance with the defined Quality of Service over at least a portion of the licensed spectrum; the transmitter further comprising:
a Quality of Service analyzer configured to select, from the lookup table, at least a portion of the available licensed spectrum to transmit any part of the baseline communications content in accordance with the defined Quality of Service, and at least a portion of the unlicensed spectrum to transmit any part of the enhanced communications content, wherein the transmitter transmits the baseline communications content and the enhanced communications content to maintain the defined Quality of Service, the selection of at least a portion of the available licensed spectrum and the at least a portion of the unlicensed spectrum is perform concurrently, and the at least a portion of the unlicensed spectrum is added dynamically.

10. The system of claim 9, wherein the baseline communications content comprise low data rate communications services.

11. The system of claim 9, wherein the enhanced communications content comprise high data rate communications services.

12. The system of claim 9, the transmitter further comprises a first frequency agile modulator configured to transmit baseline communications content via the licensed spectrum.

13. The system of claim 9, the transmitter further comprises a second frequency agile modulator configured to transmit enhanced communications content via the unlicensed spectrum.

* * * * *